June 24, 1930.  R. W. BULKELEY  1,765,714
AUTOMOBILE TOP
Filed Feb. 25, 1929  3 Sheets-Sheet 1

Inventor
Ralph W. Bulkeley
By Liverance and
Van Antwerp
Attorneys

June 24, 1930. R. W. BULKELEY 1,765,714
AUTOMOBILE TOP
Filed Feb. 25, 1929  3 Sheets-Sheet 2
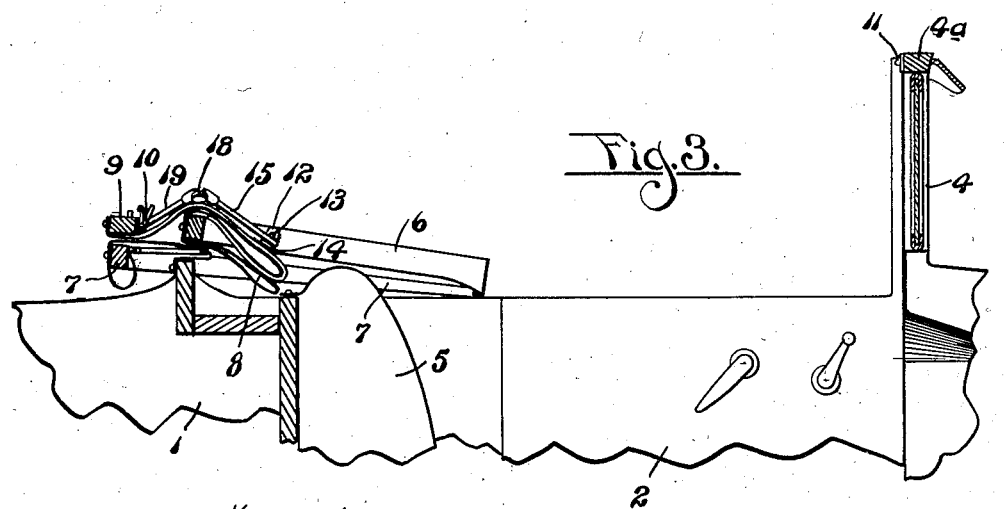
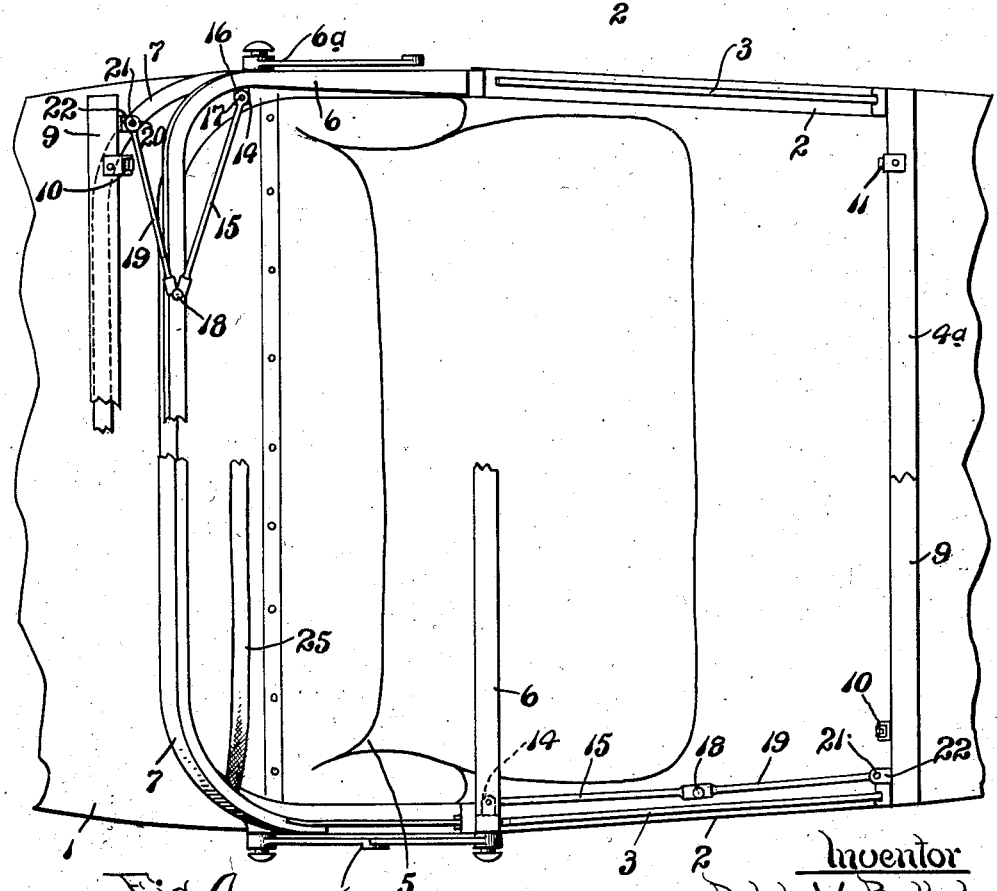

June 24, 1930.  R. W. BULKELEY  1,765,714
AUTOMOBILE TOP
Filed Feb. 25, 1929  3 Sheets-Sheet 3
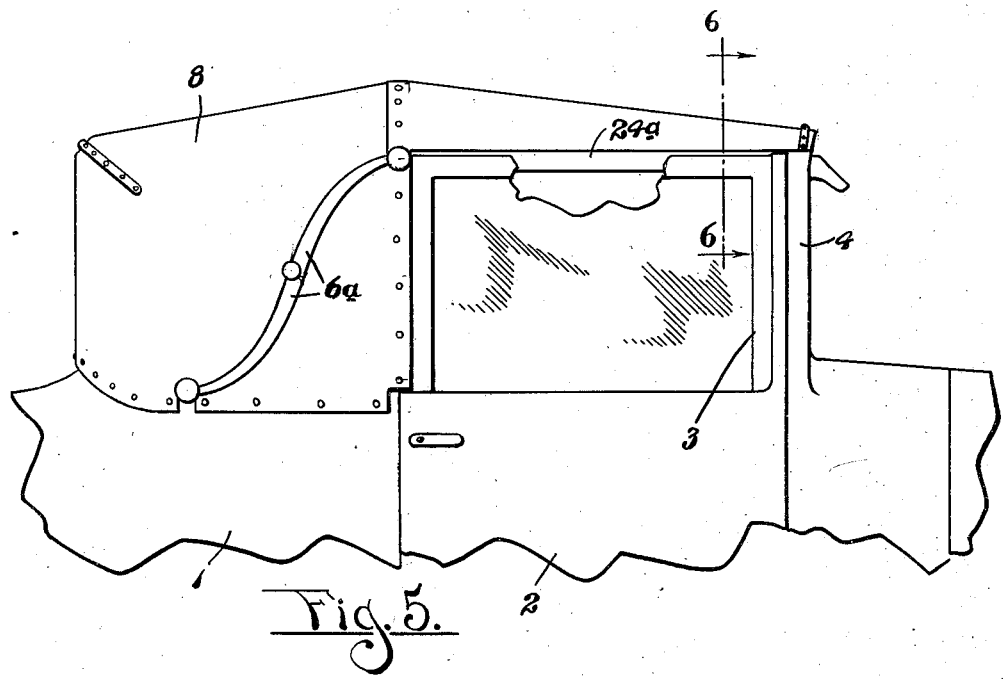
Fig. 5.
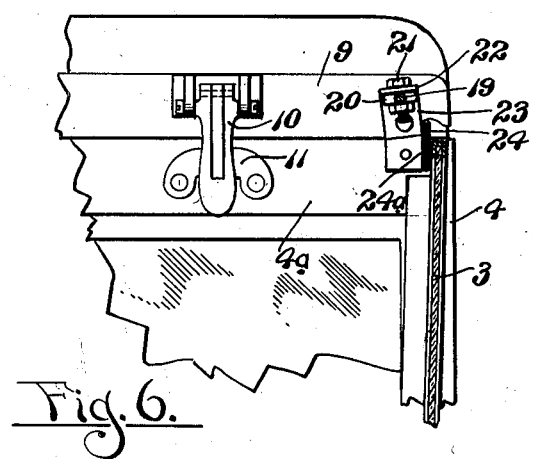
Fig. 6.
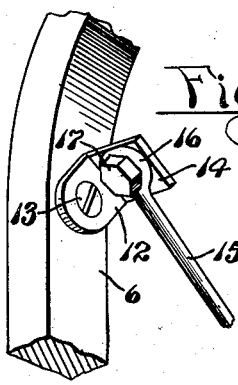
Fig. 7.
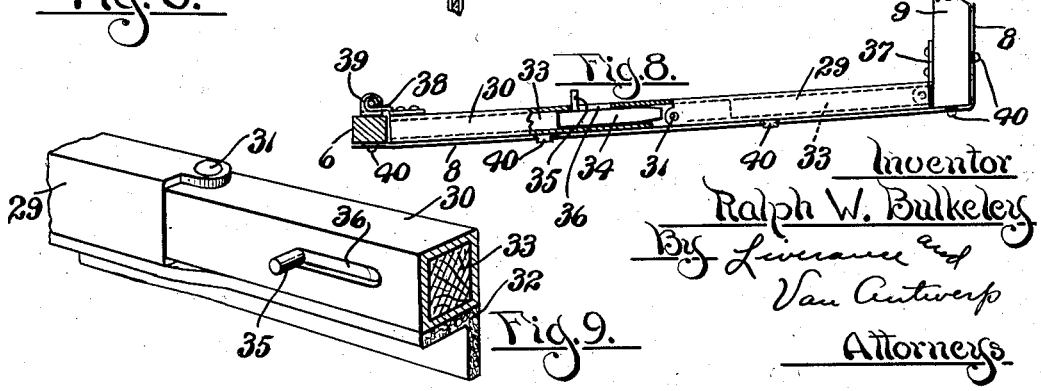
Fig. 8.
Fig. 9.
Inventor
Ralph W. Bulkeley
By Liverance and
Van Antwerp
Attorneys Patented June 24, 1930

1,765,714

UNITED STATES PATENT OFFICE

RALPH W. BULKELEY, OF GRAND RAPIDS, MICHIGAN

AUTOMOBILE TOP

Application filed February 25, 1929. Serial No. 342,342.

This invention relates to an automobile top construction, the primary object and purpose of which is to provide a top for an automobile which, in one position, completely covers the front or driving compartment of the automobile, which may be adjusted to a second position to cover only the seats with an open space left back of the windshield equal substantially to the width of the doors, while in a third position the top may be folded downwardly into a very compact space and one lower down than previously.

The invention is concerned with many improvements with respect to the construction shown in my pending application for patent, Serial No. 298,279, filed August 8, 1928, whereby the positioning of the top in the three different positions noted can be very easily and readily accomplished by one sitting in the front seat of the automobile in a very short time.

The invention consists in the combination and organization of parts, an understanding of which may be had from the following description taken in connection with the accompanying drawings, in which, Figs. 1, 2 and 3 are fragmentary longitudinal vertical sections of an automobile body having my invention of top structure applied thereto, and showing the top in the three positions described.

Fig. 4 is a fragmentary enlarged plan view of the top structure with the top fabric removed showing the same, at the upper side of the figure, as it appears when completely folded in its down position, and at the lower side of said figure, as it is when in the position shown in Fig. 1.

Fig. 5 is a fragmentary side elevation of the body with the invention of top structure applied thereto and with the top in the position indicated in Fig. 1.

Fig. 6 is a fragmentary vertical section and rear elevation enlarged, taken substantially on the plane of line 6—6 of Fig. 5, and looking in the direction indicated by the arrows.

Fig. 7 is a fragmentary enlarged detail in perspective illustrative of the universal joint construction at the rear ends of the top tightening braces one of which is used at each side of the construction, and, Figs. 8 and 9 are, respectively, a fragmentary plan and section and a fragmentary enlarged perspective view illustrating a different form of top tightening brace which may be used.

Like reference characters refer to like parts in the different figures of the drawings.

The motor vehicle body illustrated at 1, of the convertible cabriolet or rumble seat type, has front doors 2 in which glass carrying frames 3 are mounted for vertical movement, a windshield frame, including vertical sides 4 and an upper cross bar $4^a$, and seats 5 of the usual character.

Figure 1:
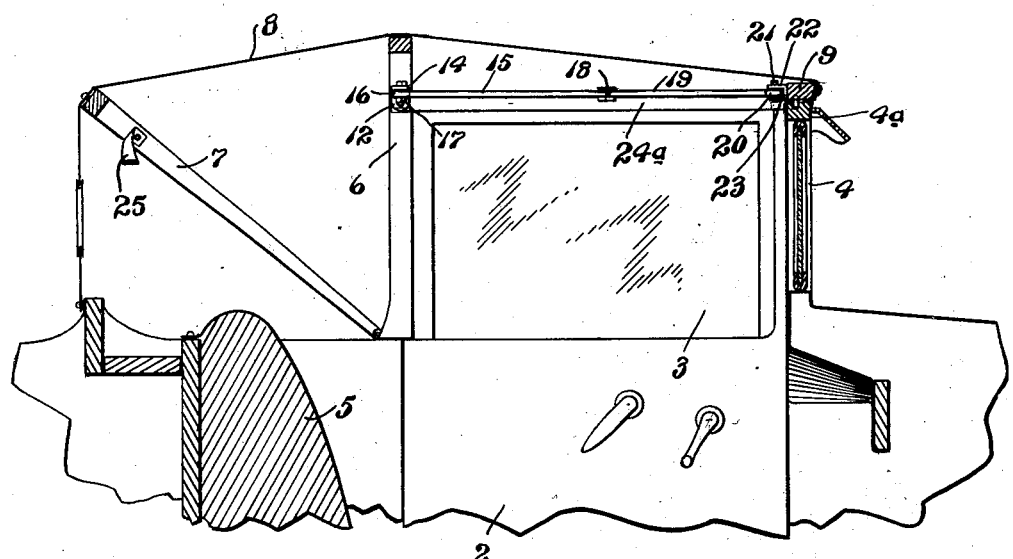

Top bows 6 and 7 are pivotally connected to the body adjacent the rear edges of the doors over which a top covering 8 is placed extending in front of the bow 6 and having connection to a front bar 9 which, in the operative position of the top wherein it covers the seats and driving compartment of the vehicle, lies above the horizontal windshield frame member $4^a$ and has dowel pins extending therefrom into suitable openings in said bar $4^a$. Latches 10 mounted at the rear sides of the bar 9 are adapted to detachably engage with keepers 11 permanently secured to the rear side of the windshield bar $4^a$, as shown in Figs. 6, it being evident that on detaching the latches the two bars are disconnected from each other. The bows 6 and 7 may be elevated to operative positions, as shown in Figs. 1 and 5, held in such position by the usual toggle-like braces $6^a$ (see Fig. 5) which, however, may be broken at the middle to permit the bows folding to the rear to flat position, as shown in Fig. 3.

Between the vertical sides of the bow 6 and the front bar 9 toggle lever top tightening braces are positioned and secured both to said bow and the bar 9. There is one of these braces at each side of the structure. Attached to the inner side of each of the vertical members of the bow 6 is a plate 12 through which a pivot 13 passes to enter the bow 6. From the plate 12 an integral section 14 is turned inwardly at right angles, it being evident that the bracket produced by the two parts 12 and 14 is capable of turning about the axis of the pivot 13. A rod 15 is formed at its rear end with an eye 16 which lies against the under side of the part 14 and is attached thereto by a bolt 17. The rod 15 is capable of turning movement about the axis of the bolt 17, the axis of which is at right angles to the axis of the pivot 13, thus providing a universal joint connection between the rod 15 and the vertical side of the bow 6 to which it is attached.

Each rod 15 at its front end has a pivotal connection, indicated at 18, to a rear end of a forward rod 19 forming the other part of the toggle brace. Each rod 19 at its front end is formed with an eye 20 through which a pivot bolt 21 passes, the bolt passing through the rearwardly extending plate 22 bent at right angles from a substantially vertical plate 23, which is permanently secured to the rear side of the bar 9, whereby the rod 19 has a pivotal movement about the axis of the bolt 21.

Figure 2:
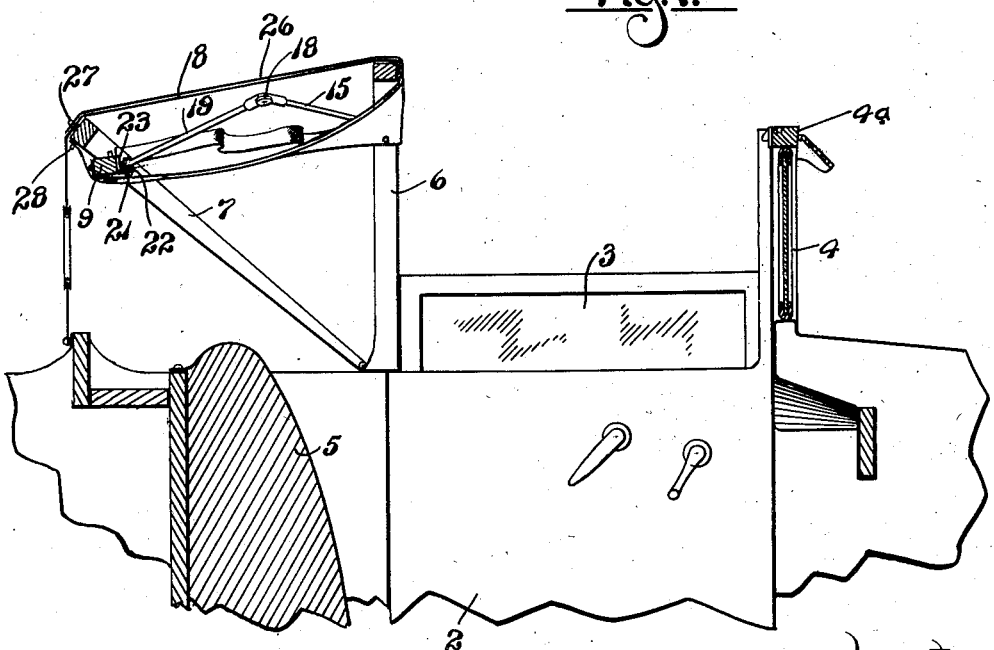

It is evident with this construction that when the bar 9 has been placed in conjunction with and over the bar 4ᵃ the toggle braces provided by the pivotally connected rod 15 and 19 may be forced outwardly by pressure applied thereto adjacent the pivots 18, thereby causing the bar 9 to be moved forward to its proper position and the top materially tightened and made smooth and taut; and that by breaking the joints of the toggle braces inwardly, said braces may be folded and the bar 9 and top material 8 connected thereto brought to the rear and under that portion of the top lying between the upper sides of the bows 6 and 7, as shown in Fig. 2. The pivotal connection of the rod 19 to the bar 9 and the universal joint connection of the rod 15 at the rear to the vertical sides of the bow 6 readily permit this folding movement.

An elastic band 24, suitably covered by a frabric covering 24ᵃ (see Fig. 6) is located at each side of the top structure, being secured at its front end to depending portions of the plate 23 and at its rear end to the bow 6. Such bands provide weather strips along the outer sides of which the upper edge portions of the door glasses 3 pass when elevated to extreme upper position, thereby keeping water, dust and the like out of the automobile when the top is in the position shown in Figs. 1 and 5 and the door windows at each side of the vehicle raised as shown in Fig. 6.

As previously stated, by disconnecting the bar 9 from the bar 4ᵃ and breaking the joints of the toggle braces inwardly, said bar 9 may be moved to the rear and under the bow 6 to the position shown in Fig. 2, whereupon it may be located above a holding strap 25 lying between opposite sides of the bow 7. In such position a covering boot 26 is secured at its rear edges to suitable fasteners 27 extending from the bow 7 and is then carried forward around the bow 6 and back underneath the part of the top structure which has been folded and attached by means of fasteners 28 to the bow 7, as shown in Fig. 2.

The entire structure described may be folded downwardly to the rear, as indicated in Fig. 3. In such case the bow 7 is folded flat to the rear and the bow 6 upon it and thereafter the toggle braces are broken inwardly and the bar 9 carried to the rear so as to lie above the bow 7 back of the bow 6, the toggle braces being tilted slightly upward to pass over the bow 6, as shown in Fig. 3; and any suitable covering boot may be applied thereto after thus folded. In such folded position the top is brought to a very low and compact position such that the driver can readily see to the rear and the usual rear vision mirror carried at the rear of the windshield will show vehicles approaching from the rear, which previously has been more or less difficult due to the space occupied by the top when it was in rear folded position in tops of the convertible carbriolet type.

In Figs. 8 and 9 a different form of toggle brace is shown. It consists of two hollow metal sections 29 and 30, preferably square in cross section, pivotally connected at adjacent ends, as at 31, and having a felt weather stripping 32 secured at the under sides of said sections, as shown in Fig. 9. The two sections 30 are preferably partly filled with wood blocks 33 which extend from the outer ends of sections inwardly for a distance but not to the pivot 31. In the space between the ends of the wood parts 33 a locking bolt 34 is mounted in the section 30 and may be manually operated by a lateral pin 35 extending through a slot 36 at the inner side of the section 30, the bolt when moved to extend across the pivot joint locking the two parts or sections rigidly together in alinement.

The front section 29 has pivotal connection to a plate 37 secured to the bar 9. The rear end of the rear section 30 carries a rearwardly extending plate 38 pivotally mounted on a bracket 39 which in turn is secured to the inner side of the bow 6, by a pivotal connection in the same manner as the bracket consisting of the parts 12 and 14, illustrated in Fig. 7, is attached to the bow. This permits the toggle brace provided by this construction to fold and turn to the rear the same as does the toggle brace provided by the two pivotally connected rods 15 and 19. The downwardly extending edge portions of the top material 8 may be detachably connected to the sides of the brace, when the top is in the position shown in Figs. 1 and 5, by suitable snap fasteners 40. The felt member 32 provides a very practical and secure weather stripping for the upper edges of the glass frames 3 when moved to upper position. The construction illustrated in Figs. 8 and 9 is more expensive than that previously described and more suitable for the finish of higher priced automobiles. The principle of operation of both, however, is the same.

From the foregoing it will be apparent that I have provided a very simple and economical construction for carrying out the purposes of the invention. The structure shown is considerably cheaper than is now used in any standard convertible cabriolet top construction. The primary advantage obtained, other than economy, is the extreme ease of operation in handling the construction to move it to either its two folded positions from the position in which it may be to any other desired position. The top may be operated by one person very quickly and easily and in most instances without moving from the seat of the automobile.

The invention is defined in the appended claims and is to be considered comprehensive of all forms of structure coming within their scope.

I claim:

1. The combination with a motor vehicle body having a front windshield frame, of top bows pivotally mounted on said body back of the windshield frame, a covering connected to the body and extending over said bows and adapted to extend to and over the windshield frame, a bar to which the top covering is connected at its front end adapted to lie above the windshield frame, means for detachably securing the bar to the windshield frame, brackets including rearwardly extending horizontal portions secured one adjacent each end and at the rear side of said bar, a toggle link pivotally mounted at its front end on each of said horizontal portions of the brackets, a second toggle link pivotally connected to the rear end of each of said first toggle links and extending rearwardly therefrom to the adjacent vertical side of the frontmost of said bows, and a universal joint connection between the rear end of each second toggle link and the adjacent side of the foremost of said bows.

2. The combination with an automobile body having a windshield, a door opening and a door for said opening, of a collapsible top for said body comprising a bow located adjacent said door opening and constituting a vertical side of said opening, a top structure associated with said bow and extending rearwardly therefrom, a bar detachably connected to the upper horizontal edge of said windshield, a flexible top covering extending between said bow and said bar and attached respectively to said members, top tightening devices extending between and attached at their respective ends to said bar and said bow and jointed between their ends for folding, and a flexible weather strip free of said top tightening devices and extending between and attached at its respective ends to said bar and said bow and located horizontally across and forming the top side of said door opening and engaged by the upper edge of said door when the door is closed.

3. The combination with an automobile body having a windshield, a door opening and a door for said opening, of a collapsible top for said body comprising a bow located adjacent and forming a vertical side of said door opening, a top structure associated with said bow and extending rearwardly therefrom, a bar detachably connected to the upper horizontal edge of said windshield, flexible top covering material extending between and attached respectively to said bow and said bar, a folding top tightening device extending between said bow and bar and jointed between its ends for folding, the forward end of said top tightening device being pivotally connected to said bar and its rear end having a universal joint connection with said bow and a flexible weather strip extending between and attached at its respective ends to said bow and bar and located horizontally across and forming the top of said door opening and engaged by said door when the door is closed.

4. The combination with an automobile having a windshield, of a collapsible top therefor comprising a bow spaced rearwardly from said windshield, a top structure associated with and extending rearwardly from said bow, a bar detachably connected to an upper horizontal edge of said windshield, a flexible top covering material extending between and attached respectively to said bow and said bar, and a folding top tightening device extending between said bow and bar and jointed between its ends to pivot on a vertical axis and pivotally connected on a vertical axis at its forward end to said bar and connected by a universal joint at its rear end to said bow.

5. The combination with an automobile body having a windshield, of a top structure on said body spaced from said windshield, a bar adapted to be located adjacent said windshield, flexible covering material extending between and connected to said top structure and said bar respectively and toggle link constructions pivotally connected at their front ends to said bar and having universal joint connections at their rear ends to said top structure.

In testimony whereof I affix my signature.

RALPH W. BULKELEY.

DISCLAIMER 1,765,714.—*Ralph W. Bulkeley*, Grand Rapids, Mich. AUTOMOBILE TOP. Patent dated June 24, 1930. Disclaimer filed April 20, 1935, by the *patentee*.

Hereby enters this disclaimer to that part of the claim in said specification which is in the following words, to wit:

"2. The combination with an automobile body having a windshield, a door opening and a door for said opening, of a collapsible top for said body comprising a bow located adjacent said door opening and constituting a vertical side of said opening, a top structure associated with said bow and extending rearwardly therefrom, a bar detachably connected to the upper horizontal edge of said windshield, a flexible top covering extending between said bow and said bar and attached respectively to said members, top tightening devices extending between and attached at their respective ends to said bar and said bow and jointed between their ends for folding, and a flexible weather strip free of said top tightening devices and extending between and attached at its respective ends to said bar and said bow and located horizontally across and forming the top side of said door opening and engaged by the upper edge of said door when the door is closed."

[*Official Gazette May 14, 1935.*]